Jan. 27, 1931. S. SIEGENTHALER 1,790,447
TRANSPORTABLE MACHINE FOR SCATTERING GRASS AND HAY
Filed Oct. 25, 1928 3 Sheets-Sheet 3

S. Siegenthaler
INVENTOR

By: Marks & Clark
Attys.

Patented Jan. 27, 1931

1,790,447

UNITED STATES PATENT OFFICE

SAMUEL SIEGENTHALER, OF HORBACH, NEAR BISCHOFSZELL, SWITZERLAND

TRANSPORTABLE MACHINE FOR SCATTERING GRASS AND HAY

Application filed October 25, 1928, Serial No. 314,990, and in Switzerland November 9, 1927.

This invention relates to a transportable machine for scattering grass and hay. When grass or hay is scattered by hay forks always some remains on the ground. This grass or hay lying in bushels or bulks is not thoroughly aired and dried up and often causes moulding in the hay stock, which often is the reason of hay stock firebrands. Furthermore unequally dried grass or hay yields bad fodder and causes disorders of the stomach and the intestines and bad qualities of the milk.

The purpose of the present invention is to overcome these disadvantages and it consists in first taking up all the cut grass or hay from the ground thoroughly stirring and finally in scattering and throwing it out so that it falls down equally distributed. The machine affords considerable reduction of working time.

For this purpose the machine comprises a main frame supported by two wheels, a second frame pivotally mounted on the first frame, a pronged roller rotatably mounted at the front end of the second frame, an endless conveyor passing over a driving roller and two guide rollers supported by the second frame for receiving and conveying backward the hay scattered and taken up by the said pronged roller, levers supported by the second frame and carrying stirring members adapted to stir the hay on the conveyer, a rake adjustably supported by the second frame and adapted to uniformly distribute the hay, a pronged drum rotatably mounted at the rear end of the second frame and adapted to throw out the hay distributed on the conveyer, means for rotating the front pronged roller from the said wheels, means for rotating the rear pronged drum from the said wheels, means for actuating the said driving roller from the said wheels and means for reciprocating the said levers from the said wheels.

Figure 1:
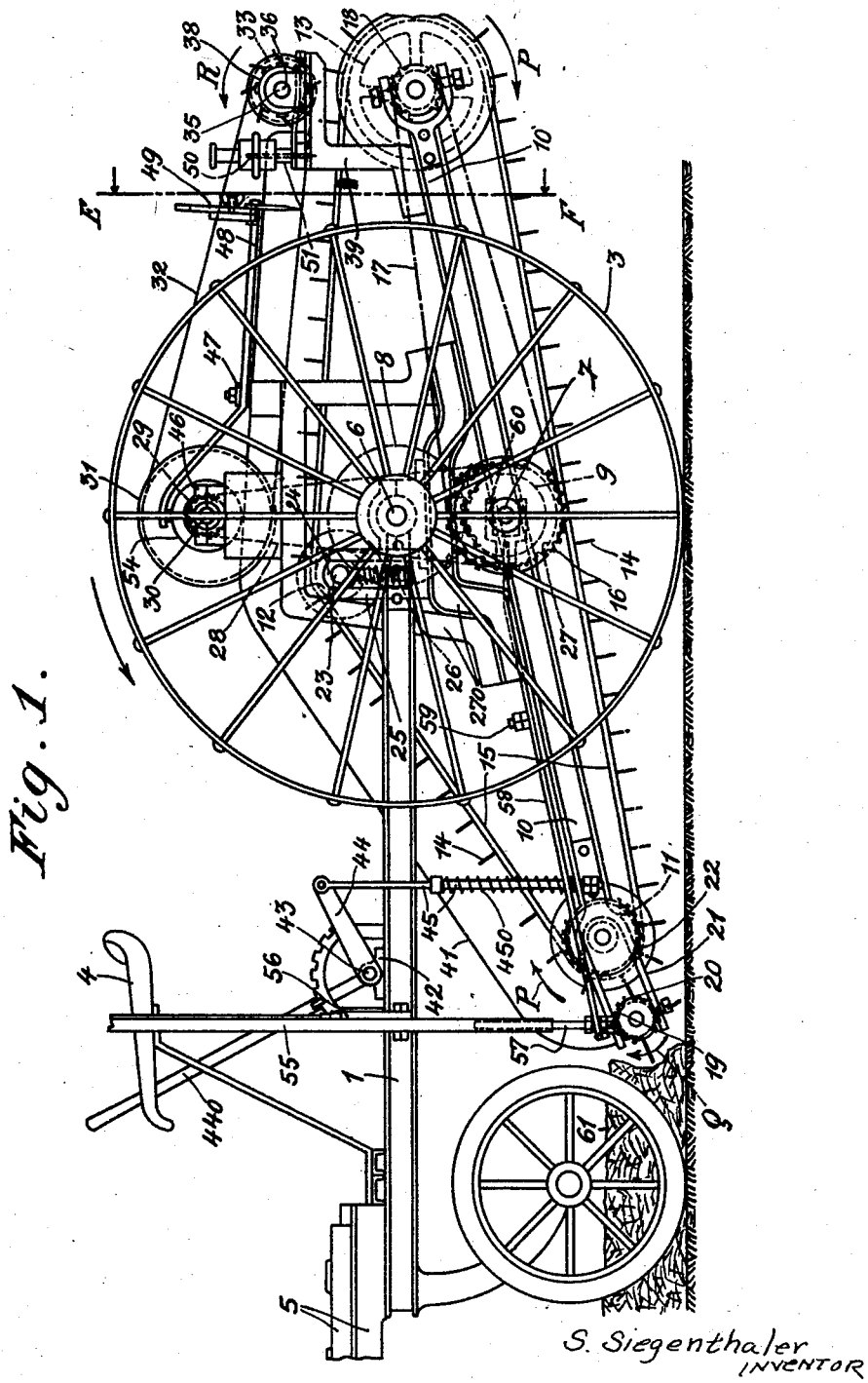
Figure 2:
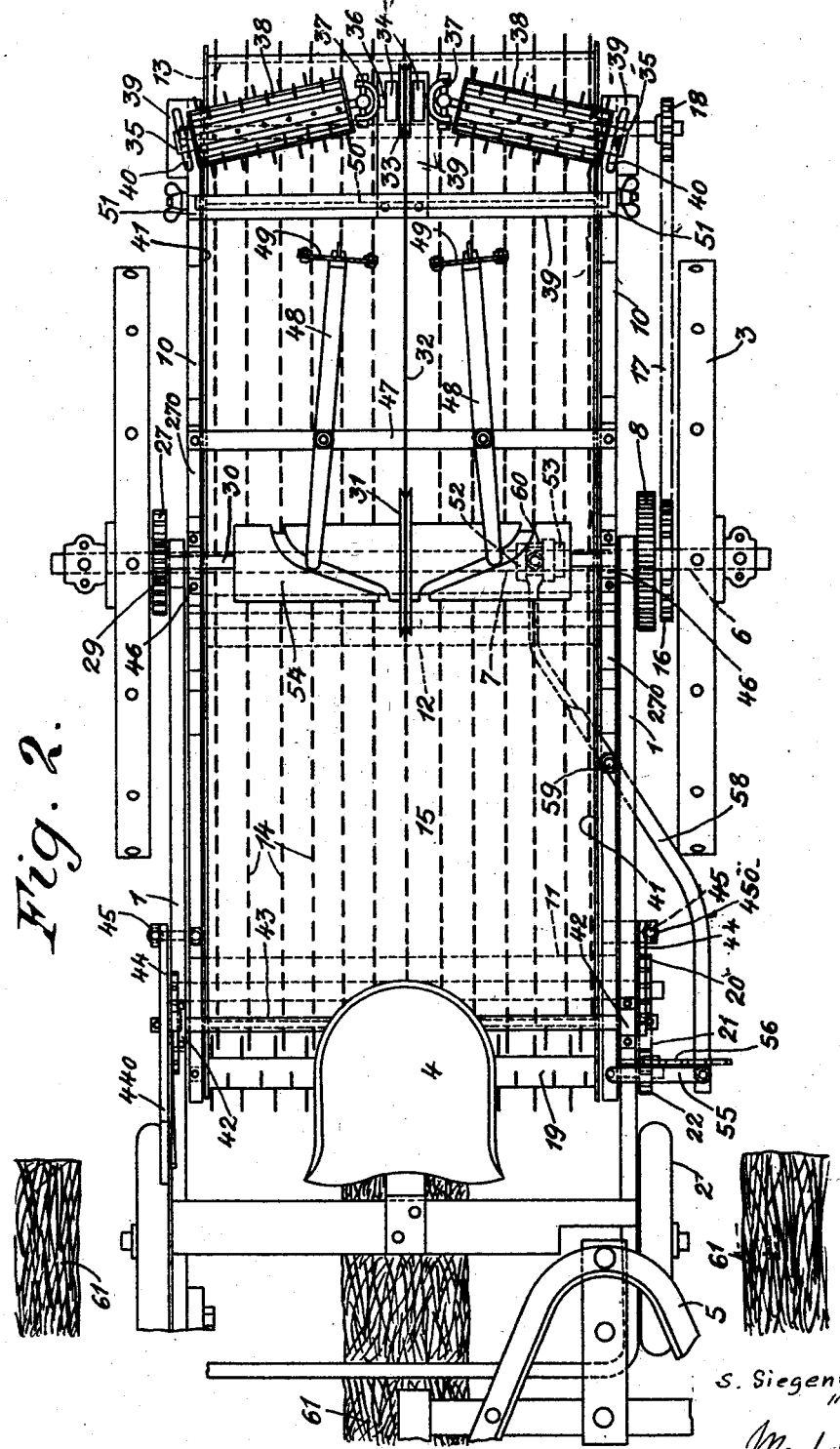
Figure 3:
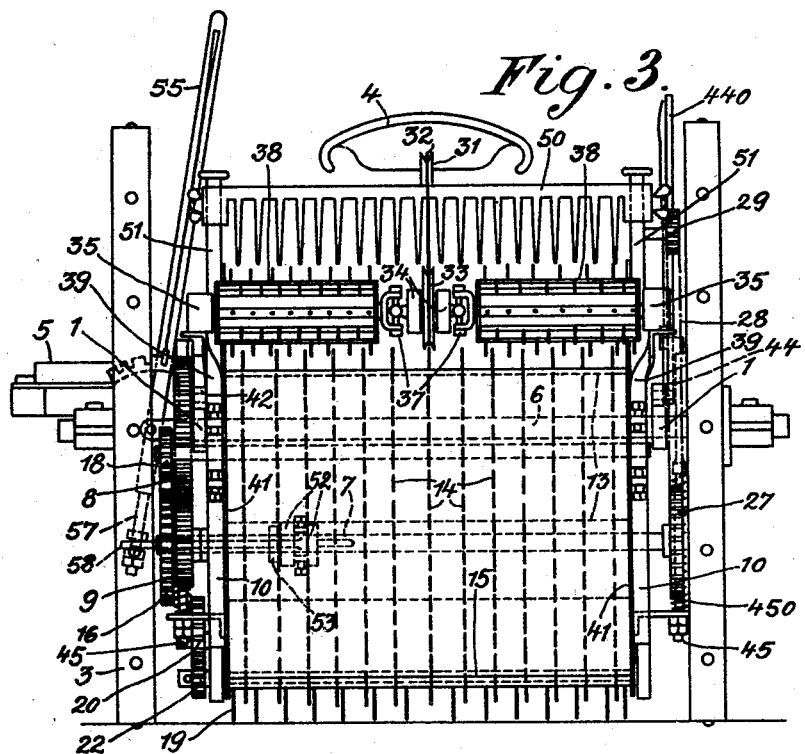
Figure 4:
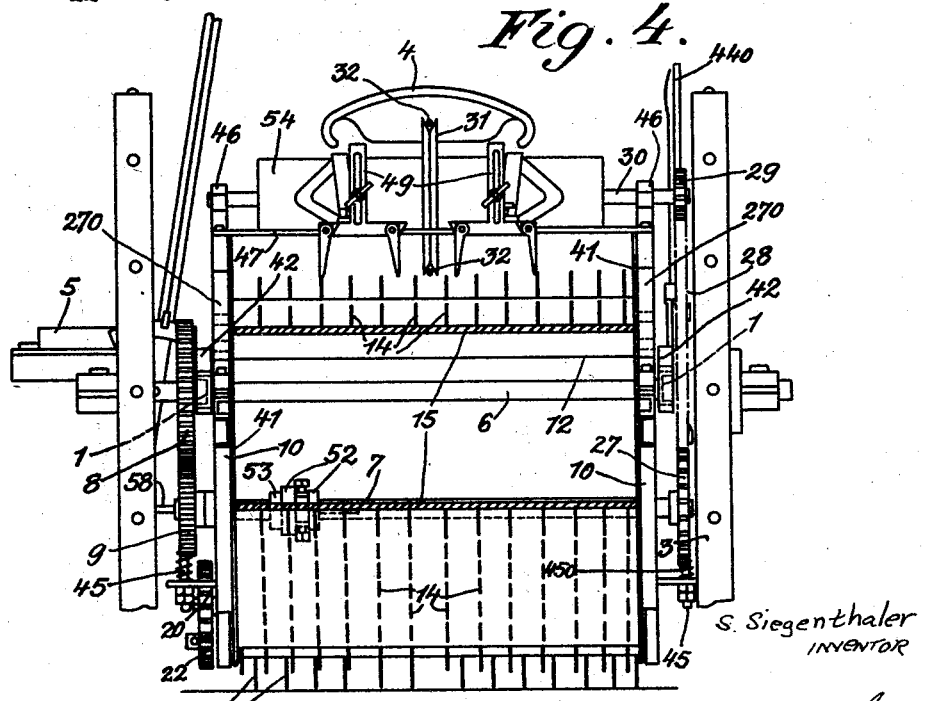

One form of execution of the invented machine is illustrated in the accompanying drawing wherein, Fig. 1 is an elevation; Fig. 2 represents a plan; Fig. 3 represents a rear end view and Fig. 4 represents a vertical section on line E—F in Fig. 1.

Similar letters of reference indicate similar parts throughout the several views.

Referring to the drawing 1 indicates a frame having front wheels 2, back wheels 3, a seat 4 for the driver and an enchasing device 5 for the horse. Of course the frame also may be driven by a motor. The shaft 6 to which the wheels 2 are fixed is journaled in the frame 1 while a coupling shaft 7 is journaled in a pivotable frame 10 beneath the wheel shaft 6. A toothed wheel 8 is fixedly mounted on the shaft 6 which meshes with a toothed wheel 9 fixed to the coupling shaft 7. The frame 10 is pivotally supported by the shaft 6 and three drums 11, 12 and 13 are journaled in the frame 10 over which drums runs an endless conveyer band 15 provided with prongs 14. A sprocket 16 is rigidly mounted on the coupling shaft 7 and connected by a chain 17 to another sprocket 18 fixed to the shaft of the drum 13. Thereby the drum 13 is driven in such a way that the upper or working drum of the band 15 moves from the front to the back of the machine to convey the hay. Tension is imparted to the conveying band 15 and controlled by means of springs 26 placed in the forks of brackets 25 and acting upon the pivot-journals 24 of the axle 23 of the upper guide drum 12. The forked brackets 25 are supported by supports 270 of the swinging frame 10.

A pronged roller 19 is journaled in the front end of the frame 10 and driven from the shaft of the front drum 11 by means of sprockets 20 and 22 and a chain 21.

A further sprocket 27 is rigidly mounted to the coupling shaft 7 which by means of a chain 28 and a sprocket 29 drives a shaft 30 on which a cam-roller 54 (described later) carrying a pulley 31 is keyed. An endless rope 32 connects the pulley 31 to a pulley 33 fixed to a broken shaft 36 the parts of which are connected by universal joints 37. The shaft 36 is journaled in brackets having ball-journals 34 and in adjustable ball-bearings 35 receiving the outer ends of the said shaft. A pronged drum 38 is arranged between each universal joint 37 and an outer bearing 35 and consists of two end discs connected by pronged bars. The outer ball-bearings 35 are adjustable in slots 40 converging to the front of the machine and provided in supports 39 fixed to the pivotable frame 10. Thus the rear drums 38 are capable to form an adjustable obtuse angle, as shown by Fig. 2; from this angle depends the lateral scattering extent. Lateral guards 41 secured to the pivotable frame 10 prevent the hay on the conveyor from laterally falling off. The gears, sprockets and chains preferably are housed in suitable casings not shown. When the machine has to run without working, the front of the pivotable frame 10 and the front pronged roller 19 have to be lifted. This will be performed by the following means:

A shaft 43 is journaled in brackets 42 fixed to the main frame 1 and rigidly carries two arms 44. To each of these arms a rod 45 loosely supporting the pivotable frame 10 is suspended. A spring 450 inserted between a collar of each rod 45 and the frame 10 acts as a buffer to receive the stocks of the frame 10 when the machine passes over uneven ground. A hand lever 440 is fixed to the shaft 43 and so arranged that it can easily be operated by the driver to lift or to lower the pivotable frame 10 as will be necessary.

As formerly described, a cam-roller 54 is secured to the shaft 30 journaled in brackets 46 of the supports 270. Two levers 48 are pivoted to a cross-bar 47 supported by the pivotable frame 10. The front ends of these levers are provided with rollers (not shown) and enter into the grooves of the cam-roller 54 whereby oscillations can be imparted to the said levers. The rear ends of the levers 48 have vertical guides to which forks 49 (see Figs. 1 and 4) are adjustably secured by means of thumb screws. Each fork has for its purpose to stir the hay thrown upon the conveyer 15 by the front pronged roller 19. Thereby each fork-prong only works in one direction and yields in the other.

Pillars 51 are fixed to the supports 39 and a horizontal rake 50 is adjustably mounted on these pillars. The rake is adapted to control the passage of the hay to the scattering drums 38 and to prevent forming of heaps of hay on the conveyer.

52 is a coupling member slidable on the coupling shaft 7 but rigidly fixed to it in the sense of rotation. This member can be engaged with another coupling member 53 connected to the sprocket 16 by the following means: A handle 55 is journaled in a bracket 56 fixed to the main frame 1 and has a tubular lower end in which a rod 57 loosely connected to the coupling lever 58 is movable. The lever 58 is pivotally mounted to a pivot 59 of the pivotable frame 10 and engages with its forked end an annular groove of the coupling member 52 to move it in and out of driving connection with the other coupling member 53. When the machine runs over unevennesses of the ground the rod 57 slides in the tubular end of the handle 55 so that no prongs of the pronged roller 19 will be injured. The handle 55 may be secured in position in usual manner by means of a blocking rod engaging a toothed segment fixed to the bracket 56.

The operation of the machine as described is as follows:

The machine is moved along a meadow and the conveyer band 15 is brought in continuous circulation in the direction of the arrow P by the different gears and sprockets driven by the running wheels 3. The front pronged roller 19 is rotated with high speed in the direction of the arrow Q and the rear drums 38 are rotated in the direction of the arrow R. The prongs of the roller 19 in taking up the hay scatter it and throw it without leaving behind a remainder on the ground upon the conveyer band 15. This carries the hay to the forks 49 of the levers 48 which stir the hay upon the conveyer. The rake 50 controls the passage of the hay to the rear scattering or throwing out drums 38 in such a way that hay if too much is deposited on the conveyer in some place will be retained and thereupon delivered to places to which less hay has been deposited by the forks 49. The pronged drums 38 throw out backwards the regularly distributed hay. Proportionally to the mutual angular adjustment of the two rear drums 38, the scattering extent is greater or less, the extent being the greater the less the said angle is.

When no further work of the machine is desired, the coupling 52, 53 is disengaged and the front part of the movable frame is lifted. Only a single scattering drum 38 parallel to the rake 50 may be used instead of two.

What I claim is:—

1. In a machine of the class described, the combination with driving wheels, of an endless conveyer, gearing for transmitting motion from the driving wheels to the endless conveyer, a pronged roller rotatably journaled in front of the endless conveyer to take up the hay and throw it upon the conveyer, gearing for transmitting motion from the driving wheels to the said pronged roller, stirring members adapted to stir the hay carried by the conveyer, gearing for transmitting motion from the driving wheels to the stirring members, a bi-parted pronged drum rotatably mounted over the rear end of the conveyer to throw out the hay carried by the conveyer, the two parts of the said drum being angularly adjustable one to the other to control the scattering extent of the drum, and gearing for transmitting motion from the driving wheels to the pronged drums.

2. In a machine of the class described, the combination with driving wheels, of an endless conveyer, gearing for transmitting motion from the driving wheels to the endless conveyer, a pronged roller rotatably journaled in front of the endless conveyer to take up the hay and throw it upon the conveyer, gearing for transmitting motion from the driving wheels to the said pronged roller, stirring members adapted to stir the hay carried by the conveyer, gearing for transmitting motion from the driving wheels to the stirring members, a rake adjustably supported over the conveyer and adapted to uniformly discharge the hay, a bi-parted pronged drum rotatably mounted over the rear end of the conveyer to throw out the hay carried by the conveyer, the two parts of the said drum being angularly adjustable one to the other to control the scattering extent of the drum, and gearing for transmitting motion from the driving wheels to the pronged drums.

3. In a machine of the class described, the combination with driving wheels, of an endless conveyer, gearing for transmitting motion from the driving wheels to the endless conveyer, a pronged roller rotatably journaled in front of the endless conveyer to take up the hay and throw it upon the conveyer, stirring up members carried by levers and adapted to stir the hay carried by the conveyer, a cam roller having grooves adapted to operate the said levers, gearing for transmitting motion from the driving wheels to the said cam roller, a bi-parted pronged drum rotatably mounted over the rear end of the conveyer to throw out the hay carried by the conveyer, the two parts of the said drum being angularly adjustable one to the other to control the scattering extent of the drum and gearing for transmitting motion from the driving wheels to the pronged drums.

In testimony whereof I have affixed my signature.

SAMUEL SIEGENTHALER.